Nov. 24, 1931.  I. F. BLIER  1,832,854
AUTOMATIC ROASTING APPARATUS
Filed Feb. 21, 1931    2 Sheets-Sheet 1
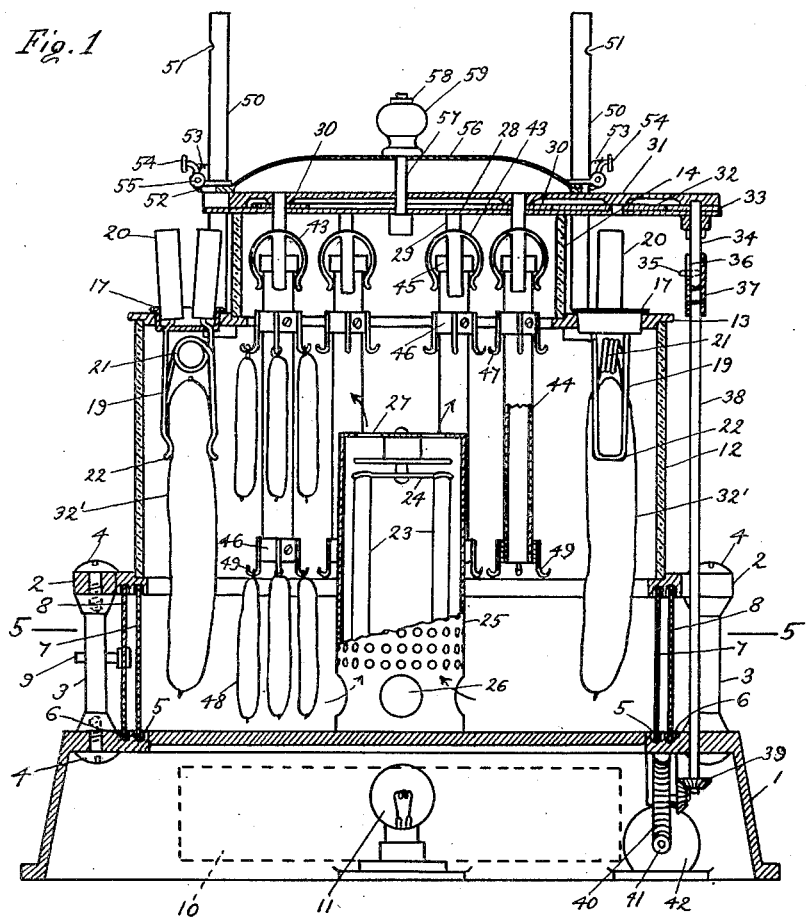
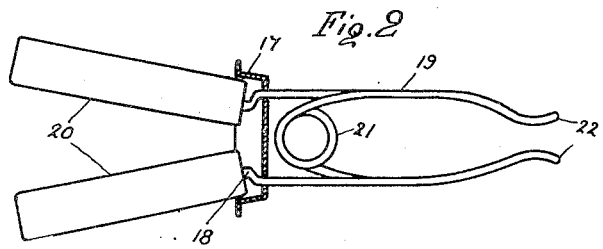
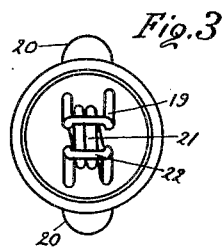
ISAAK F. BLIER
INVENTOR Nov. 24, 1931. I. F. BLIER 1,832,854
AUTOMATIC ROASTING APPARATUS
Filed Feb. 21, 1931 2 Sheets-Sheet 2

Isaak F. Blier
INVENTOR

BY John P. Nironow
ATTORNEY

Patented Nov. 24, 1931

1,832,854

UNITED STATES PATENT OFFICE

ISAAK F. BLIER, OF JERSEY CITY, NEW JERSEY

AUTOMATIC ROASTING APPARATUS

Application filed February 21, 1931. Serial No. 517,525.

My invention relates to automatic roasting apparatus and has a particular reference to apparatus for roasting articles of food, such as sausages (commonly called "Wieners" or "Frankfurters").

The object of my invention is to provide an apparatus for continuous roasting of sausages, uniformly on all sides, in a convenient housing well covered on all sides so as to protect the articles from dust, wind, etc., when the apparatus is placed on an open table. I also provide convenient means for holding the articles while they are being roasted, the holders being separately removable from the apparatus. Another object of my invention is to provide an apparatus attractive and decorative in appearance in addition to being adapted to roast food articles in a clean and hygienic manner.

My invention is more fully described in the accompanying specification and drawings in which—

Figure 4:
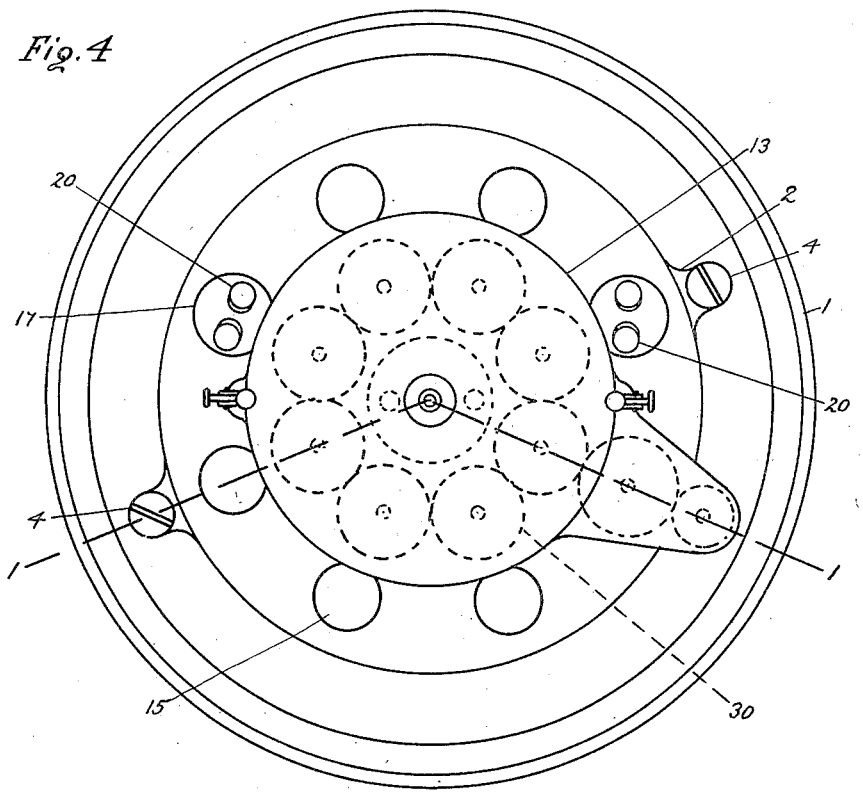
Figure 5:
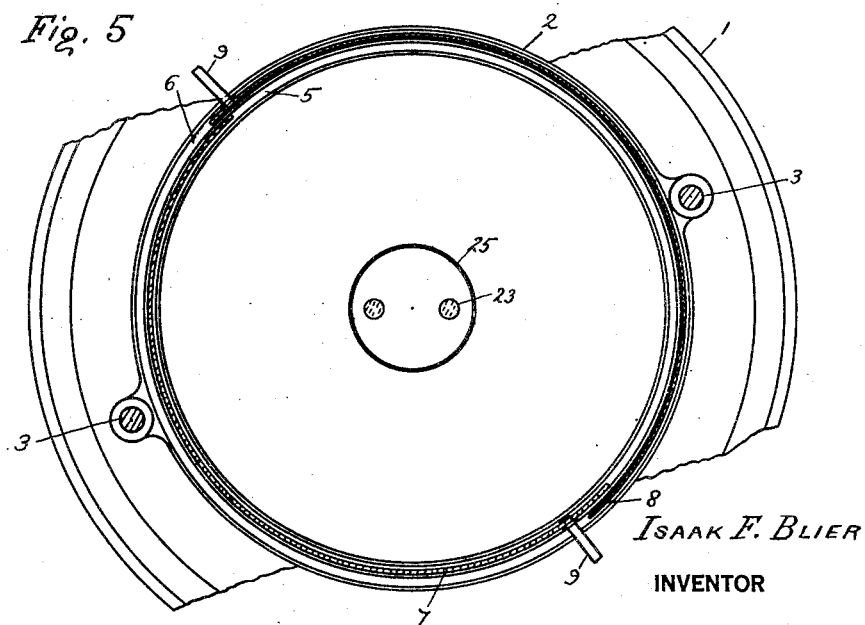

Fig. 1 is a sectional elevation taken on the line 1—1 (Fig. 4), Fig. 2 is a detail view of the sausage holder, Fig. 3 is an end view of same, Fig. 4 is a top view of my device, and Fig. 5 is a sectional view taken on the line 5—5 (Fig. 1).

My roasting apparatus consists of a base 1 supporting an intermediate ring 2 on posts 3 secured with screws 4. The base and the ring have concentric grooves 5 and 6 in which semicircular shutters 7 and 8 are slidably fitted. The shutters have handles 9 for turning them around thereby exposing any portion of the space inside of the apparatus. The top surface of the base is made smooth for cleaning, and it forms the bottom of the roasting chamber. A sliding door with a drawer 10 is fitted in the base for heating bread or rolls used in the preparation of sandwiches with the sausages. Additional heat for this purpose is supplied by an electric lamp 11 placed on one side of the base at the end of the drawer.

The ring 2 supports a glass cylinder 12. An intermediate ring-shaped cover 13 is placed on the upper edge of the cylinder 12 and supports on its inner edge an upper or second glass cylinder 14.

It is understood, of course, that the cylinders 12 and 14 may be made of any suitable material, for instance, metal, although glass has an advantage that it permits an observation of the articles of food while they are being roasted.

The cover 13 has several holes 15 for sausage holders 16. These holders consist of cups 17 with flanges, the latter adapted to rest against the upper surface of the cover 13 when the cups are placed in the holes 15. Ends 18 of wire clamps 19 pass through the caps and are fitted in the handles 20. The clamp 19 is formed of a single piece of resilient wire and has a spiral spring 21 in the middle which tends to bring together the clamping ends 22 thereby holding the sausage (or other article of food) by its end as shown in Fig. 1. The clamping ends become separated when the handles 20 are brought together thereby permitting the insertion or withdrawal of the sausage.

An electric heater is placed on the base 1 consisting of two carbon electrodes or resistance units 23 joined on top with a resilient contact bar 24 and connected at the bottom with a source of electric current (not shown). This resistance element is fully described in my copending application No. 462,293, filed June 19, 1930.

A cylinder 25 made of perforated metal sheet is placed over the heater to protect the latter from coming in contact with sausages and to distribute the heat more uniformly inside of the roasting chamber. Large holes 26 and 27 are provided at the bottom and top of the cylinder 25 so as to insure energetic air circulation over the heater.

Any other suitable heater can be also employed instead of the electric resistance unit, for instance, a gas burner.

A top plate 28 is placed on the cylinder 14 and is provided with holes for short shafts 29. Gears 30 are mounted on these shafts and rotatively rest on the plate 28. A second plate 31 is placed over the first plate 28, the shafts 29 being journaled in these two plates.

All the gears 30 are in mesh with each other forming a continuous circle of gears as shown with dotted lines in Fig. 4. One of the gears is also in mesh with gears 32 and 33 the latter having a shaft extension 34 with a pin 35 fitting in a slot 36 in a coupling sleeve 37 attached to the end of a driving shaft 38. The lower end of this shaft is connected through gears 39, worm gears 40 and worm 41 to an electric motor 42 mounted in the base 1.

The shafts 29 support resilient clamps 43 adapted to hold metal tubes 44. The upper ends of these tubes are provided with enlargements 45 to prevent their slipping from the clamps 43. Upper and lower rings 46 are fastened to the tubes 44 with screws 47. These rings can be placed in any position in accordance with the length of sausages 48 which are hung on hooks 49 supported by the rings 46.

The plates 28 and 31 are slidably supported on vertical rods 50 which are mounted on the cover 13. The upper ends of these rods have grooves or notches 51 for latches 52 supported on the plate 31. Springs 53 keep these latches pressed against the rods 50 and support the plates 28 and 31 in the raised position when the ends of the latches fit in the slots 51. Thumb heads 54 serve to release the latches the latter being pivotally mounted on pins 55. A light cover 56 is placed over the plate 31 and is fastened by a bolt 57 with a nut 58. An ornamental handle 59 is placed under the nut 58.

The operation of my apparatus is as follows.

Sausages 32' are clamped in the holders 19 which are then placed in the holes 15 so that the sausages will hang in the roasting chamber around the heater 23.

Smaller sausages 48 are hung on the hooks 49 and are slowly turned around on the shafts 29 so as to obtain a uniform heating for all these sausages. The shafts 29 are rotated by the gears 30, 32, 33, shafts 34 and 38, gears 39 and 40, by the motor 42 through the worm 41.

The larger sausages 32' are turned by hand with their clamps 19.

The lower sausages 48 can be removed through the openings formed when both doors or plates 7 and 8 are moved to one side of the apparatus. In order to remove or to assemble the upper sausages, the top plates 28 and 31 with the cover 56 are raised on the rods 50 until the latches 52 engage the slots 51 thereby supporting the assembly in the raised position when the upper sausages are accessible. The upper shaft 34 slides out of the coupling sleeve 37 when the plates are raised, and fits again when they are lowered, the pin 35 sliding into the slot 36.

The apparatus can be arranged for sausages of different sizes, for instance, to roast large sausages on the hooks 49, or for any other similar articles of food.

The rolls or bread are kept warm in the drawer 10 in the base.

Important advantages of my apparatus are that it can quickly and uniformly roast a large number of sausages of one or different sizes, also that the roasting is done in an enclosed place protected from dust and dirt, no manual labor is required for turning the central sausages, the apparatus is simple and convenient to handle, and is attractive and ornamental in its appearance.

I claim as my invention:

1. In an automatic roasting apparatus, the combination with a cylindrical chamber, a heater in said chamber, a ring-shaped cover on said chamber, said cover being provided with a plurality of apertures, holders removably fitted in said apertures for articles of food, a second chamber supported on the inner edge of said cover, covering plates on top of said second chamber, short shafts extending from said plates into said second chamber, means to support a plurality of food articles on each of said shafts, means to rotate said shafts on their axes, said plates being adapted to be raised above said second chamber, and means to support said plates in their raised position.

2. In an automatic roasting apparatus, the combination with a chamber, a heater in said chamber, a ring-shaped cover on said chamber, means to support articles of food from said cover in said chamber, a cylinder supported on the inner edge of said cover, plates on top of said cover, guiding rods for said plates on said ring-shaped cover, said plates being adapted to be raised on said rods, and latches on said plates adapted to engage said rods when said plates are in their raised position.

3. In an automatic roasting apparatus, the combination with a chamber, of a heater in said chamber, a ring-shaped cover on said chamber, means to support articles of food on said cover inside of said chamber, a cylinder on said cover, plates on top of said cylinder, shafts rotatively supported in said plates, means to support a plurality of articles of food on each of said shafts, means to rotate said shafts on their axis, said plates with said shafts being adapted to be raised above said cylinder, and means to support said plates in their raised position.

4. In an automatic roasting apparatus, the combination with a base, of a cylinder on said base forming a roasting chamber, a heater in said chamber, a cover above said chamber, a plurality of clamps in said cover, tubular members adapted to be removably supported on said clamps, each of said tubular members being adapted to support a plurality of sausages, means to rotate said clamps with said members, said cover with said clamps being adapted to be raised from said chamber, and means to support said cover with said clamps in its raised position.

5. In an automatic roasting apparatus, the combination with a base provided with concentric grooves on its upper surface, a ring supported above said base and provided with concentric grooves on its lower surface corresponding to the groves in said base, semicircular plates slidably fitted in said grooves and forming a closed chamber when moved to the opposite sides of said base, and adapted to form openings when moved to one side of said base, a transparent cylinder placed on said ring, a heating device on said base, a cover above said transparent cylinder, a plurality of clamps in said cover, means to support a plurality of sausages on each of said clamps, said cover being adapted to be raised above said cylinder, means to support said cover in its raised position, and means to rotate said clamps.

6. In an automatic roasting apparatus, the combination with a base provided with adjacent concentric grooves on its top, a ring supported at an elevation above said base, concentric ridges on the lower surface of said ring forming grooves corresponding to said base grooves, two semicircular plates slidably fitted in said grooves and adapted to be moved to one side forming large openings or to be moved to the opposite sides forming a closed chamber, a transparent cylinder supported on said ring, a heater on said base, a cover on said cylinder, means to support a plurality of articles of food under said cover in upper and lower rows, means to rotate said articles of food, said cover with said articles of food being adapted to be raised above said cylinder, and means to support said cover in its raised position.

In testimony whereof I affix my signature.

ISAAK F. BLIER.